(12) United States Patent
Sharp et al.

(10) Patent No.: US 11,628,655 B2
(45) Date of Patent: Apr. 18, 2023

(54) EQUIPMENT AND PROCESSES FOR PRECISION FABRICATION OF SOLVENT-LAMINATED RETARDER-STACKS

(71) Applicant: META PLATFORMS TECHNOLOGIES, LLC, Menlo Park, CA (US)

(72) Inventors: Gary D Sharp, Boulder, CO (US); David A Coleman, Louisville, CO (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/352,586

(22) Filed: Jun. 21, 2021

(65) Prior Publication Data

US 2021/0394498 A1    Dec. 23, 2021

Related U.S. Application Data

(60) Provisional application No. 63/041,978, filed on Jun. 21, 2020.

(51) Int. Cl.
| | |
|---|---|
| *B32B 41/00* | (2006.01) |
| *B32B 27/08* | (2006.01) |
| *B32B 37/00* | (2006.01) |
| *B32B 37/22* | (2006.01) |
| *B32B 3/28* | (2006.01) |
| *B32B 37/12* | (2006.01) |

(52) U.S. Cl.
CPC ............. *B32B 27/08* (2013.01); *B32B 3/28* (2013.01); *B32B 37/0053* (2013.01); *B32B 37/12* (2013.01); *B32B 37/226* (2013.01); *B32B 41/00* (2013.01)

(58) Field of Classification Search
CPC ....... B32B 27/08; B32B 3/28; B32B 37/0053; B32B 37/12; B32B 7/226; B32B 41/00; B32B 37/226
USPC .................... 156/60, 64, 350, 351, 378, 379
See application file for complete search history.

(56) References Cited

U.S. PATENT DOCUMENTS

| | | | | |
|---|---|---|---|---|
| 6,638,583 B1 * | 10/2003 | Sharp | ................ | B29C 66/83411 428/1.5 |
| 2012/0090786 A1 * | 4/2012 | Jeong | .................. | B32B 38/1833 156/350 |

* cited by examiner

Primary Examiner — Michael N Orlando
Assistant Examiner — Joshel Rivera
(74) Attorney, Agent, or Firm — Greenberg Traurig, LLP

(57) ABSTRACT

A laminator for high-precision solvent-bonding of retardation films is disclosed. The laminator is capable of producing laminates with high orientation repeatability and low in-plane stress which can otherwise create gaps between optimum theoretical performance and that which is physically realizable. Batch-mode laminators are scalable to large area mother-sheets and are suited to high-throughput manufacturing.

11 Claims, 12 Drawing Sheets

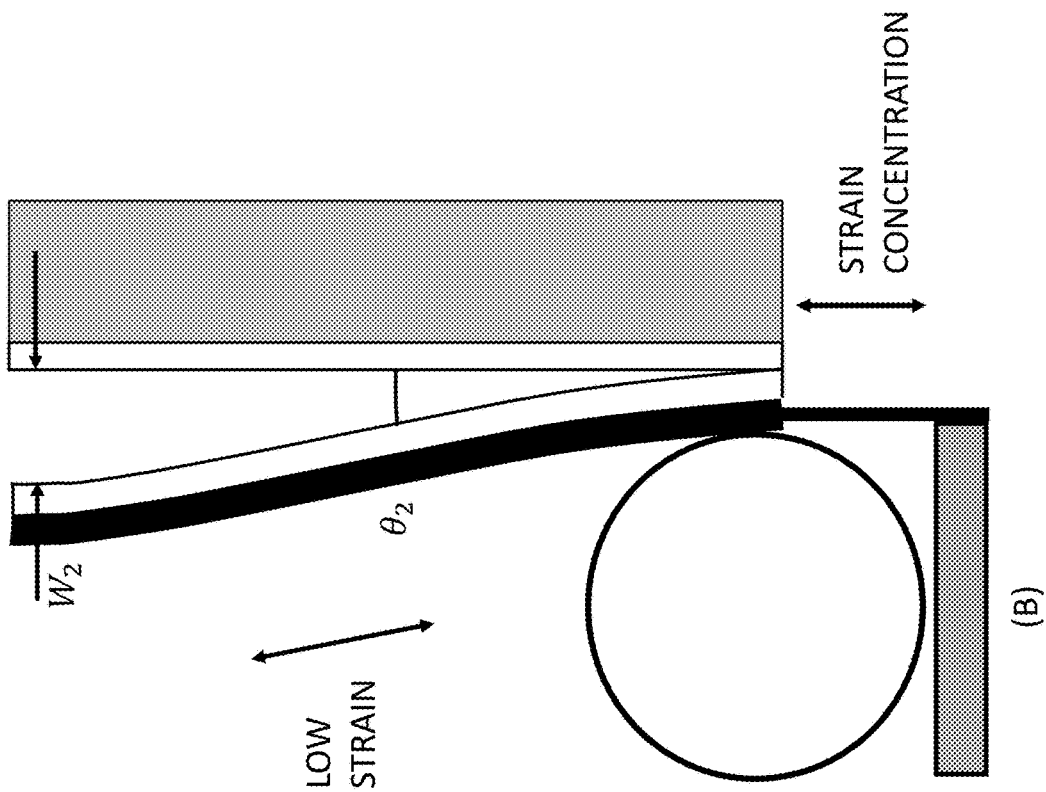
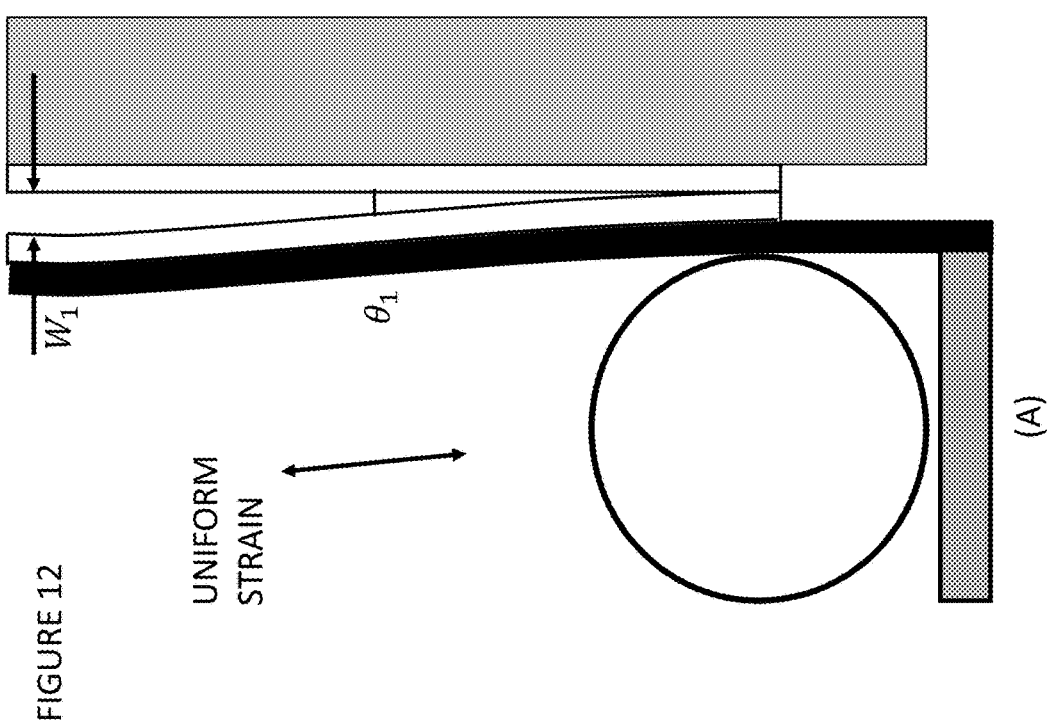
FIGURE 12

EQUIPMENT AND PROCESSES FOR PRECISION FABRICATION OF SOLVENT-LAMINATED RETARDER-STACKS

CROSS-REFERENCE

This application claims priority to U.S. Provisional Application No. 63/041,978 filed Jun. 21, 2020, the contents of which are incorporated herein by reference in its entirety.

BACKGROUND

The most common family of adhesives used for laminating optical retarder (aka phase-difference) films is acrylic-based pressure-sensitive-adhesive (PSA). PSAs, sometimes referred to as optically-clear adhesives (OCAs), are typically 25-50 microns thick, have a refractive index of approximately 1.46, and can form large-area joins between substrates such as cellulose-triacetate (CTA, or TAC), polycarbonate (PC), and cyclic-olefin polymers (COP or COC). It is typical for pre-lamination surface-activation (e.g. plasma or corona) to be used to promote adhesion, and post-lamination autoclaving to be used for eliminating haze and microbubbles. Batch-mode laminators (as distinct from roll-to-roll laminators), such as those used for laminating polarizer and retarder-film to liquid-crystal-display televisions and monitors, are common-place. Modern techniques using a vacuum membrane to provide in-plane support for the entire film during lamination can minimizing stress for two important reasons: First, the film conforms to the membrane via vacuum, minimizing transverse nonuniformity in pressure that can otherwise occur when the nip is formed. Second, the membrane, in conjunction with a translating lamination roller, minimizes stress in the machine-direction that can otherwise occur (e.g.) when pulling the film off of a vacuum stage. By maintaining a small gap between the two films during lamination, the amount of strain is minimized. Stages with xy-theta manipulation in conjunction with machine-vision cameras are also useful for precision high-throughput film-to-display and film-to-film laminations.

Solvent-bonding of retarder films is also described for joining layers of polycarbonate, with all of the benefits of eliminating the need for an adhesive. A solvent bonding apparatus is described where a reference-guide on the delivery-device parallel to the lamination direction is used to determine position in the transverse-direction as well as the orientation. Position in the machine-direction (or lamination direction) can be set by a reference-stop on the motion-control stage. The laminator can form a nip by pressing the lower portion of the film suspended below the film delivery-device against the film on the movable backing surface. This nip can determine the start-of-lamination initial-conditions, which can impact the quality if the entire lamination. This includes the precise input film orientation, as well as the distribution of pressure in the transverse direction.

Retarder stacks, such as those required for converting from linear to circular polarization (and vice-versa) over a broad range of wavelengths, can have near-ideal theoretical reverse-dispersion. For instance, an engineered retarder-stack can produce an ellipticity field-ratio exceeding 0.99 over the entire visible band (400-700 nm), which may be required in high-performance optical systems. Lamination equipment and a lamination process that is capable of high-precision in optic-axis orientation and minimal induced stress is in general sought.

SUMMARY

The disclosure herein describes batch-mode solvent-lamination equipment and processes that minimize uncertainty in the fabrication of precision optical retarder-stacks. Optical retarder-stacks are composed of layers of oriented transparent film, that enable an engineered impulse-response that can address a broad range of polarization-control functions. These techniques seek to minimize uncertainty in position/orientation of each ply in a solvent-welding retarder-stack lamination process. They also seek to minimize internal in-plane stress in retarder stacks at the point of lamination that can otherwise occur in prior-art lamination processes. The embodiments generally introduce process control in the manipulation of the input, or feed-film, to the welding process. In particular, they seek to control the leading-edge of the feed-film up to and including the critical step of forming the lamination nip.

Solvent lamination equipment and processes are described herein that minimize uncertainty in film orientation and best preserve the as-fabricated statistics of the base retardation film. The former refers to methods for achieving high-repeatability in the orientation placement of the feed-film (or input film) based on a reliable mechanical reference (e.g. a film edge). The latter refers to the uniformity of the pressure in the nip along the roller axis, which is established during nip formation. In the event of such a nonuniformity, a local in-plane compressive load may exist on the input film, which can compromise the optic-axis and phase-difference statistics. Moreover, this nonuniformity can propagate along the machine-direction during lamination, affecting the performance of the entire mother sheet. Because solvent lamination involves no adhesives that could potentially introduce mechanical compliance, any such stresses can be permanently frozen into the structure at the instant the bond is formed. The techniques described herein are aimed at overcoming uncertainty in nip formation and other potential lamination stresses that can compromise the performance of retarder-stacks.

The equipment and processes disclosed herein ideally create an immunity to many of the specific characteristic of the input (feed) film, making the process more robust. This can be accomplished by providing a pre-loading mechanism at/near the leading-edge of the input film, such that it is supported during the critical nip-formation step. Formation of the nip involves at least four elements. In a single-roller configuration, this includes the input film, the pressure-roller, the build-plate, and the build-film (Work-In-Progress, WIP stack) affixed to the build-plate. Embodiments support as much of the input film area as possible using some form of reference surface to flatten the film prior to nip-formation. This is accomplished while minimizing in-plane stress, particularly in the region that the nip is formed. In another embodiment, a fifth element (a deformable support member) is introduced to provide full support of the feed-film.

The performance of a retarder stack fabricated according to the teachings herein relies upon maintaining the as-fabricated in-plane pathlength-difference (aka $R_e$) and optic-axis orientation of each base film. High peel-strength solvent bonds use a solvent suitable for virtually instantaneously softening the surface of the substrates without significantly compromising the $R_e$ value. With adequate pressure/time (or energy), the bond can be formed. Uniform down-force applied for lamination is not detrimental to the functional performance of a resulting stack. However, any in-plane stress that occurs during lamination can severely compromise performance. Described herein are several sources of in-plane stress, as well as non-uniform down-force that can impact retarder-stacks, and equipment/processes for minimizing their impact.

BRIEF DESCRIPTION OF THE DRAWINGS

FIG. 12. Side-view of nip region for two solvent-laminator configurations that use a deformable support member (DSM) with; (A) a narrow-gap and a conventional uniform-strain over the DSM, and (B) a wide-gap and a two-piece DSM, where the outer portion relieves most of the strain.

DETAILED DESCRIPTION

Figure 1:
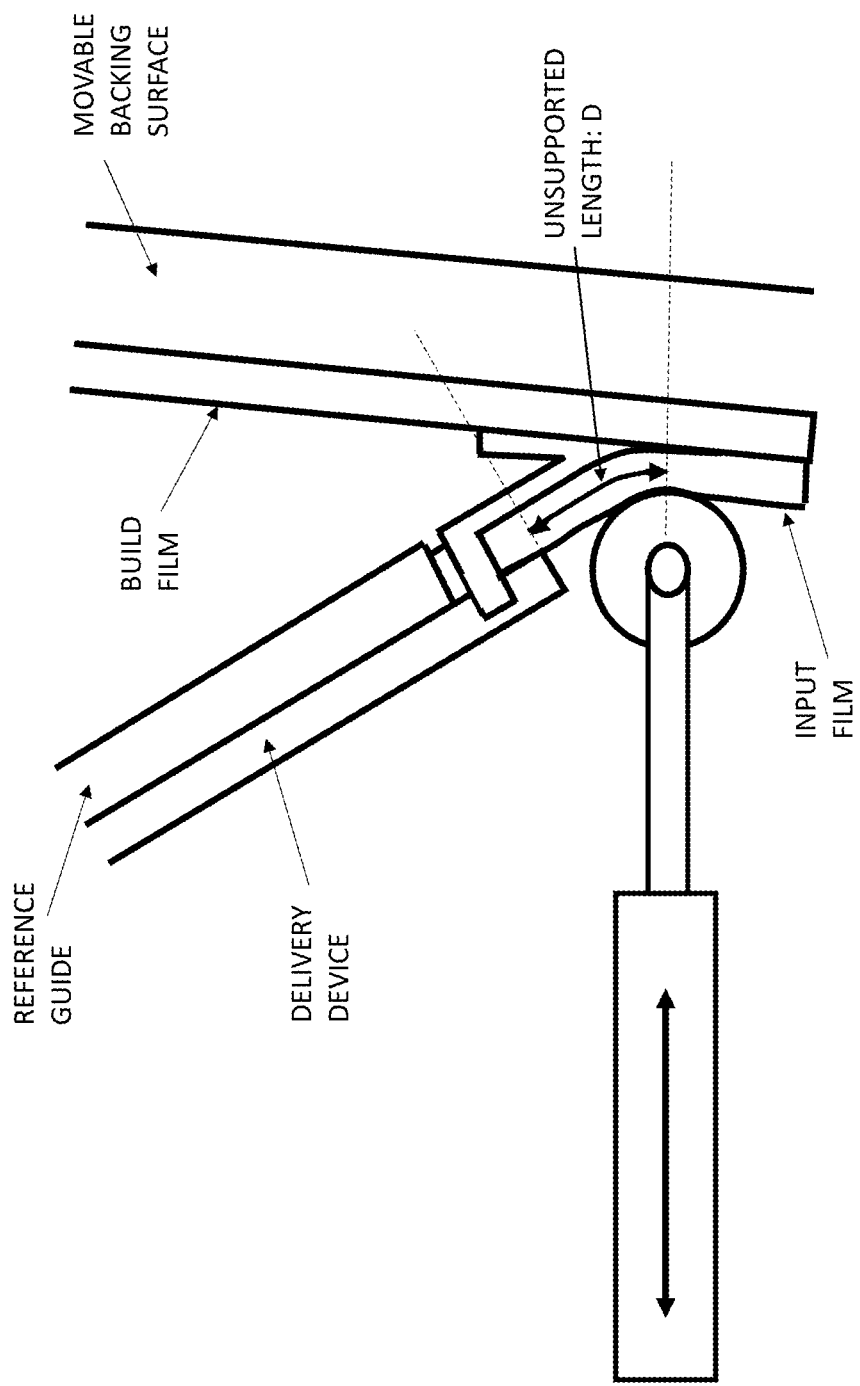
FIG. 1. Prior art apparatus for solvent welding polycarbonate retarder films together.

These techniques are motivated by the need for high-precision, large-area, manufacturable optical retarder-stacks for polarization control. These stacks are needed for augmented-reality, virtual reality headsets (e.g. polarization-based pancake lenses and optical isolators), direct-view display (e.g. ambient light control, sunlight-readability, and OLED display isolators), stray-light mitigation, image-capture filters, wavelength-selective polarization control, polarimetry, sunglasses, color-vision-deficiency eyewear, and other custom-engineered optical components. These stacks are typically transparent stretched polymers with one or more of machine-direction, transverse-direction, or diagonal in-plane stretching. Thicknesses typically range from 25 microns, to 100 microns. While most substrates (e.g. polycarbonate or cyclic-olefins) tend to exhibit increased refractive index in the stretching direction (positive anisotropy), there are other less-common substrates (e.g. polystyrene) which exhibit negative anisotropy. Polycarbonate retarders are very applicable to situations in which a large in-plane optical pathlength difference ($R_e$) is needed (e.g. 400-2,000 nm), or price is very sensitive (e.g. 3D cinema eyewear). Manufacturers include Teijin and Kaneka. Cyclic-olefins (e.g. Cyclic Olefin Polymer from Zeon, or Cyclic Olefin Copolymer such as Arton from JSR) are optically clear, flat, lower refractive index, low birefringence dispersion, low moisture absorption, and are very applicable to cases where the required in-plane optical pathlength difference is lower, $R_e$<300 nm. In the context of manufacturing robust high-performance retarder stacks, COP is usually preferred for reasons of as-fabricated statistics, low stress-optic coefficient, low elongation under tension (i.e. high Young's modulus), and environmental robustness (e.g. stress from swelling due to moisture absorption). For example, multi-layer achromatic circular polarizers require pathlength-differences in the range of 100-300 nm, which is within the manufacturing range of COP. In the event that a solvent laminator produces any in-plane stress, the impact on a COP stack is less than that from a similar PC stack.

Retarder films are manufactured in a continuous web-process by heating a uniform-thickness cast/extruded transparent film to (near) the glass-transition temperature and stretching it by an amount that achieves a prescribed spatially-uniform pathlength-difference. Web-widths range from 500 mm to over 1,300 mm and lengths can be hundreds of meters. One or more machine-direction slit edges can be provided by the manufacturer, though some uncertainty may exist in the orientation of the optic-axis relative to a slit edge. As uniformity is never perfect, testing may be required to accurately locate the optic axis. There tends to be greater statistical variation in retardation/optic-axis in the cross-web direction than in the down-web direction. Retarder-stacks generally use a plurality of optic-axis orientations, and as such, they are generally manufactured via a batch-process using one or two retardation values. These techniques are particularly drawn to methods that support batch-processes. As required by the specific design, each layer of a mother-sheet is cut from the web at the appropriate angle using a mechanical or laser process. Mother sheet sizes may be (e.g.) A4, though scaling to (e.g.) A2 is preferable for manufacturing cost reduction. The machine designs assume that the base-film retardation/optic-axis statistics, testing protocol, and mother-sheet cutting process collectively optimize the statistical properties of the input mother-sheets. The mother sheets each have at least one reference edge with adequate straightness (or an equivalent reliable registration feature), reliable optic-axis orientation relative to that edge, and adequate in-plane pathlength difference ($R_e$) statistics. As such, it is assumed that the best possible retarder-stack performance is achieved when the laminator produces mother-stacks with a high-degree of repeatability in the alignment of edge orientation and with minimal lamination-induced changes in $R_e$.

After fabrication (i.e. in the glassy state), a retarder film remains vulnerable to any elastic deformation from a lamination process. The extent of that vulnerability depends upon the amount of stress applied ($\sigma$, or force per unit cross-sectional area), as well as the stress-optic coefficient (C, or birefringence ($\Delta n$) induced per unit of stress). The optical pathlength-difference induced in a film can be expressed by $$\Delta n\, d = \sigma C\, d$$

for a film with thickness d. A film with cross-sectional area defined by the product of d and width w, subjected to a small force F along its length, has an induced pathlength-difference per unit of force given by $$\frac{\Delta n d}{F} = \frac{C}{w}$$

For instance, if vacuum is applied to a feed-stage during lamination, the input film may be under a quasi-uniform tension in the machine-direction at the point of lamination. The process may also produce a more localized force (e.g. due to fixturing), which can be more impactful than one which is evenly distributed over the width. Also, per the above equation, solvent welding of low stress-optic coefficient polymers is generally preferred. If an in-plane force is applied at the point of lamination (i.e. in the nip), it can become permanent when performing a solvent-lamination. By contrast, a PSA layer provides some compliance that can relieve stress, and a back-end thermal process can even potentially relax some stress associated with the lamination process. If a small uniaxial in-plane stress is applied to a retardation film along the slow-axis (positive anisotropic), the retardation increases in proportion to the increase in slow-axis refractive-index and the optic-axis orientation remains stable. Similarly, if a small stress is applied to a retardation film perpendicular to the slow-axis, the retardation decreases in proportion to the increase in refractive-index perpendicular to the slow-axis and the optic-axis is again stable. If a stress is applied at +45° to the slow-axis, the retardation is substantially stable and the optic-axis rotates with sign dependent upon the orientation of the stress. At other angles, there is a mixture of retardation and optic-axis orientation change. Accordingly, lamination processes are sought that minimize in-plane elastic deformation at the point of lamination, thus optimizing the performance of the resulting stack.

A film can also be elastically deformed when it is conformal to a lamination roller. For a single-roller lamination process with a planar backing surface, the input film may be conformal to the roller at the point of lamination, where the build-side (or stack) may be under substantially no in-plane stress. For a roller with radius R, the interior stress at the point of contact is given by $$\sigma = \frac{Ed}{2R}$$

Where E is Young's modulus for the film. This stress can be frozen into a solvent bond potentially causing curl. But even in the absence of significant curl, there can be significant changes in the polarization functionality. Fortunately, most retarder films in the 25-100 µm thickness range are soft enough that the bending stress at the point of lamination is acceptable for roller diameters >30 mm.

In a single-roller lamination process, nip formation involves bringing together four elements: (1) The lamination roller, (2) the input film (including any protective liner), (3) the build-film including any lower protective liner, and (4) the build-plate. Because of sheet flexibility and lie-flat issues, the handling of the input film during nip formation tends to be the most problematic. The entire area of the build-stack is rigidly supported by the build-plate, so it is relatively well supported, and the roller need only extend to form the nip. The various embodiments have the common goal of supporting the input film during nip formation and subsequent lamination.

Mother sheet configurations can vary significantly depending upon substrate chemistry, surface energy, thickness, flatness, molecular weight/durometer, type/thickness and application process of any protective liner, and general lie-flat characteristics of the input film. A film may have roll-set, and therefore have a tendency to curl up/down after cutting to mother-sheet size. The exact axis of curl may depend upon the orientation of the optic-axis relative to an edge. A film may have an antireflection coating which can cause stress-induced curl. A film may have a protective liner that causes curl or is laminated under mechanical load, affecting the lie-flat. A film may absorb moisture, inducing a curl. A film may have high surface-energy and thus tend to form discrete optical contacts when brought into proximity of the film on the build-plate. The manufacturing process for the film may cause (e.g.) cross-web variations in lie-flat, such as a ripple. All of the above variables in mother-sheet characteristics can introduce uncertainty in a prior-art solvent lamination process that can impact the performance of the resulting retarder-stack. First and foremost, these metrics include lamination orientation repeatability and non-uniformity in in-plane stress of the input-film.

It is of course preferred that each mother sheet lies flat when it is not under significant external load (e.g., just gravity). Since the finished retarder-stack is typically required to be planar, any bending-force required to flatten each sheet can itself change the in-plane stress at the point of lamination. Base films that require insignificant bending force to create a flat sheet (e.g., typical of that required to conform to a lamination roller) are much preferred. Moreover, protective liners present during lamination should not significantly degrade the lie-flat characteristics of the retarder film.

Fixturing of the input-film in a solvent lamination process can be critical to the physical orientation control of the film, as well as maintenance of the $R_e$ and optic-axis uniformities. According to a prior-art process, a film ply can be inserted on a vacuum feed-plate, slid into the nip region, and registered to a reference-guide. If the vacuum is sufficiently strong (e.g., if a strong vacuum hold-down exists between the film and feed-plate), the orientation with respect to the guide can be reliable. However, a length of unsupported film that overhangs the end of the feed plate for the purpose of establishing the nip can be problematic. The unsupported length, which includes the overhang portion (minimally that required to extend into the nip), and potentially a length at the end of the feed-plate that lacks vacuum support, can introduce uncertainty in film orientation. This can occur even if the film is butted accurately to a reference-guide. FIG. 1 shows a side-view of a prior-art apparatus (U.S. Pat. No. 6,638,583, or '583) for solvent-laminating polycarbonate retardation films. The present disclosure identifies the minimum unsupported length of film on the drawing, D, which extends from the end of the film delivery device to the contact point. As shown the distance is approximately equal to the diameter of the roller.

Lamination control in the '583 apparatus of FIG. 1 is influenced by the characteristics of the input film and the unsupported length. For example, if a film tends to curl upward, the unsupported length may be inclined to spontaneously form one or more localized contacts with the film on the build-side. In this instance, the surface energy of the films may be sufficient to create locations where an optical contact is formed and the input film "hangs up" on the build-film when it is slid into position. When this occurs, the film may lift with respect to the feed plate, and that height may be a function of position in the transverse (roller-axis) direction. If the associated force on the film is sufficient to break vacuum hold-down near the end of the feed plate, the unsupported length can effectively increase and the problem can be exacerbated. If an A4 sheet is laminated (210 mm transverse width) and the required tolerance on orientation is 0.1°, the associated height difference along the transverse direction is 367 microns. If this height difference persists after the lamination roller extends, a 0.1° error in film orientation is "baked" into the finished lamination.

If a film tends to curl downward in the '583 apparatus, the unsupported length may make no initial contact when it is slid into the lamination position. If the curl is extreme, the film may make initial contact with the roller. In either case, the films are brought into contact only after the roller extends and forms the nip. In this case, the roller may again lift the film upward locally and introduce uncertainty in orientation when it is captured in the nip. Note that the axis of curl (which can be a function of optic-axis orientation relative to the edge) can influence where the roller makes initial contact with the film. This can, for example, preferentially lift one corner more than the other.

Figure 2:
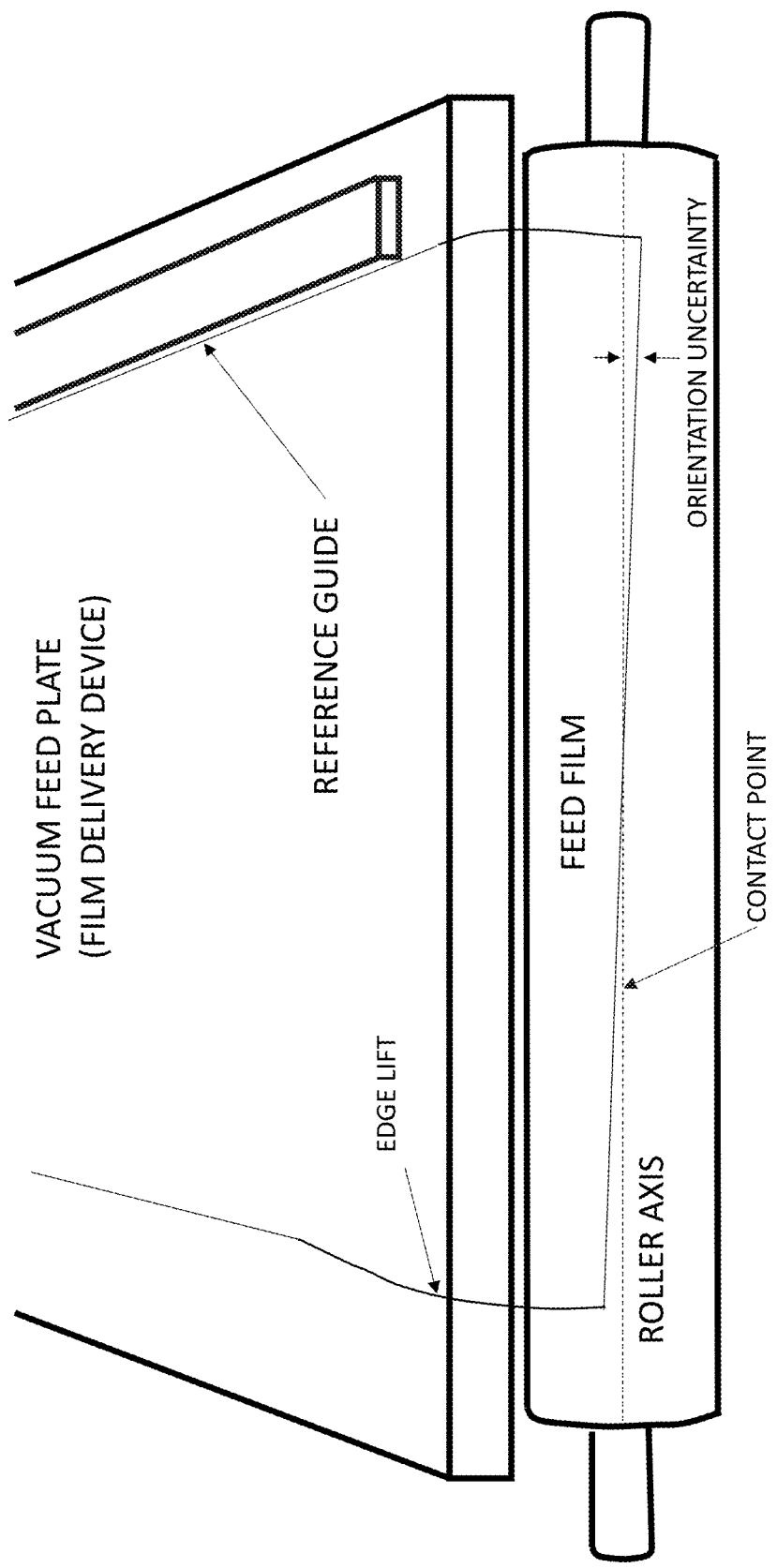
FIG. 2. Uncertainty in angle between the feed-film edge and the roller axis that can occur from an unsupported film in a prior-art welding apparatus.

FIG. 2 illustrates a first issue that can occur in the prior-art ('583) apparatus of FIG. 1. It shows a view from the movable backing-surface of the film delivery device and roller. Edge-lift of the input-film can occur either from interaction with the roller during extension, via contact of the input-film with the build-film prior to extension of the roller, or both. As shown in the figure, random manipulation of the input-film leading-edge can create uncertainty in the angle between the film transverse edge and the roller-axis. While the machine-direction edge of the film may appear to be accurately butted to the reference-guide, the orientation error can still exist when the nip is formed, and that error can be a permanent orientation error in the welded stack.

Figure 3:
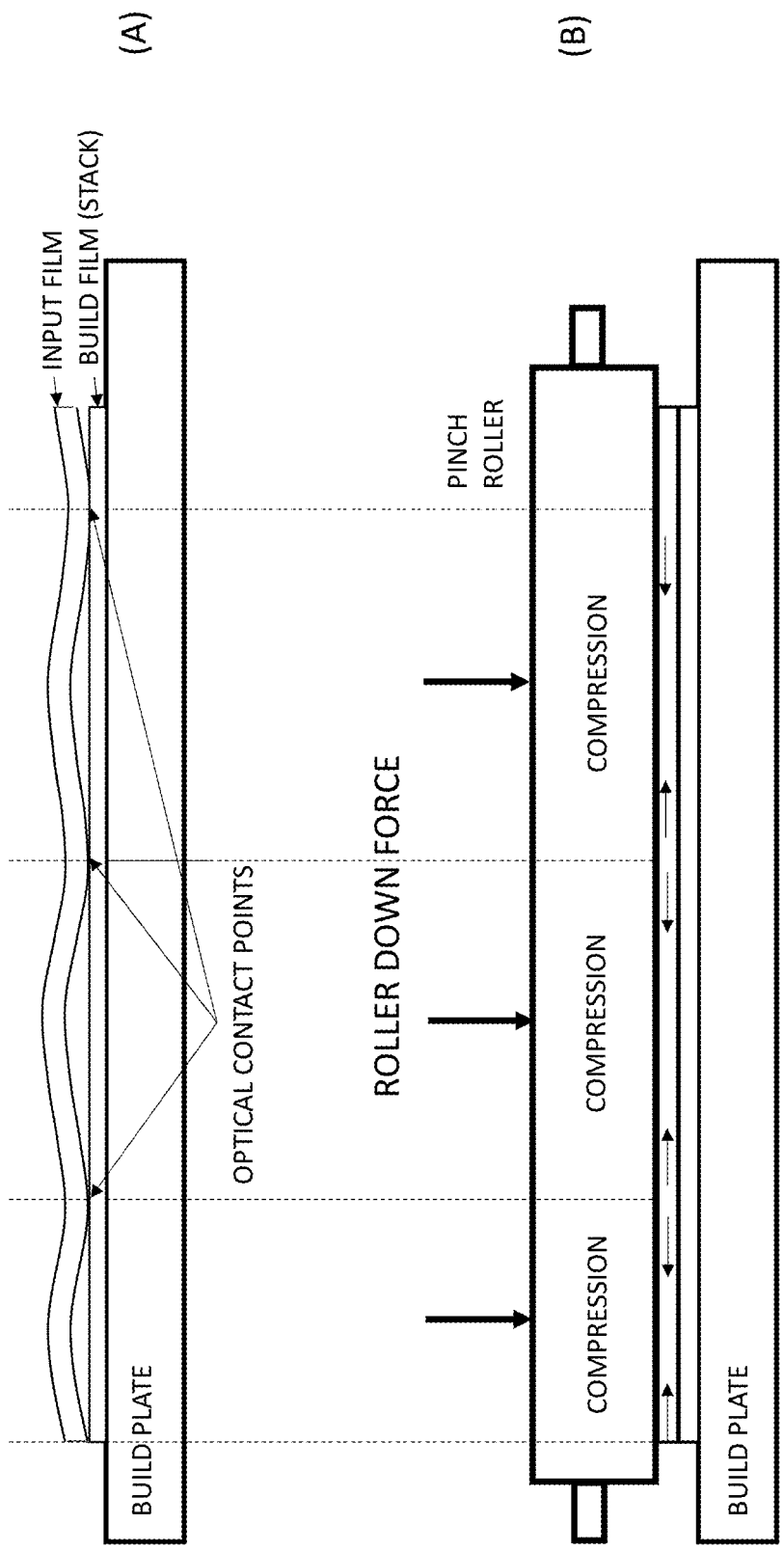
FIG. 3. Local in-plane compressive stress that can occur when forming a nip with an unsupported film in a prior-art welding apparatus.

FIG. 3 illustrates a second issue that can occur in the prior art ('583) apparatus of FIG. 1. As stated previously, the unsupported leading-edge of an input film may make initial contact with the build-film surface, it may make initial contact with the roller, or it may make no contact until the roller is extended. Regardless, the unsupported length of the film is substantially unconstrained in the prior-art apparatus until it is captured in the nip. At the point that the nip is being formed, the leading-edge may randomly contact the build-film in one or more locations. This contact may shift the film orientation, but it can also create local in-plane stress regions. FIG. 3A shows an input film on the feed-plate prior to application of vacuum, where three contact points are spontaneously made with the build-film. FIG. 3B illustrates the in-plane stress induced when the roller extends and the input-film is captured. The films may have high surface-energy, such that after the contacts are made there may be no further slip that could otherwise relieve stress and create uniform pressure (i.e. only down-force). If there is no slip, the input-film can experience localized compressive in-plane stress between the contact points. When the solvent is dispensed and the weld commences, this stress may not be relieved and the initial-condition may propagate the entire length of the mother-sheet. Again, this situation results from the unconstrained leading-edge of the input film.

Figure 4:
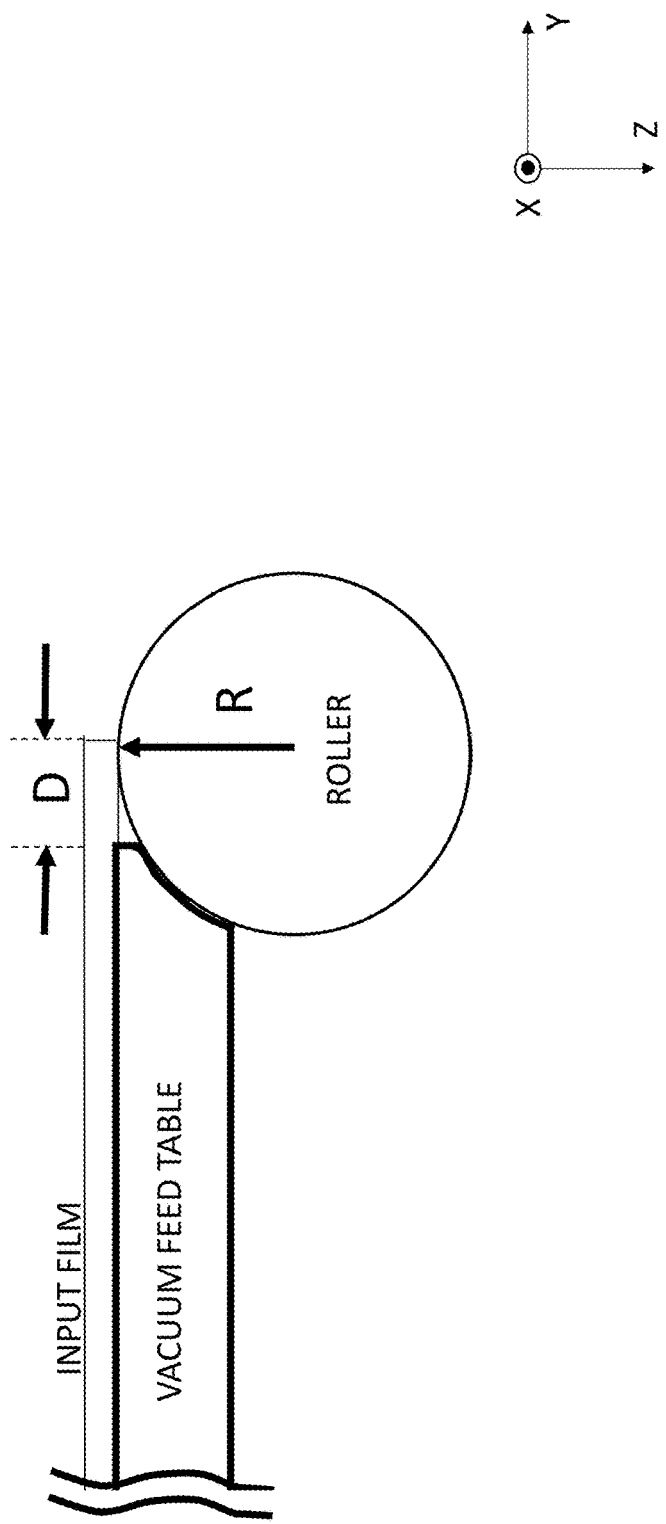
FIG. 4. Configuration for a feed-plate that minimizes the unsupported length (D) of a film leading-edge.

FIG. 4 shows the side-view of a portion of an exemplary feed-plate. The input film is shown, already conformal to the feed-plate, with a minimal length of unsupported film, D, overhanging. The feed-plate may have a low surface-energy coating (e.g. Teflon, PTFE or a Parylene coating), the film may have a low surface-energy protective liner, or both, such that the action of making the film conformal to the feed-plate induces no significant in-plane stress. The feed-plate optimally provides down-force on the input-film over the entire surface, such that the film is effectively infinitely-rigid as close to the nip region as possible. The lower side of the build-plate may be thinned near the end, such that the roller to be brought as close to the end of the feed-plate as possible. For a lamination roller with radius R, the length of unsupported feed-film is preferably <R, or more preferably, close to R/2. The top of the roller may be substantially co-planar with the feed-plate, or slightly above it to facilitate contact. The roller may be composed of a low surface-energy material, or it may have a low surface-energy coating such that the leading-edge of the film makes uniform contact with the top of the roller when the feed-plate applies down-force.

Figure 5:
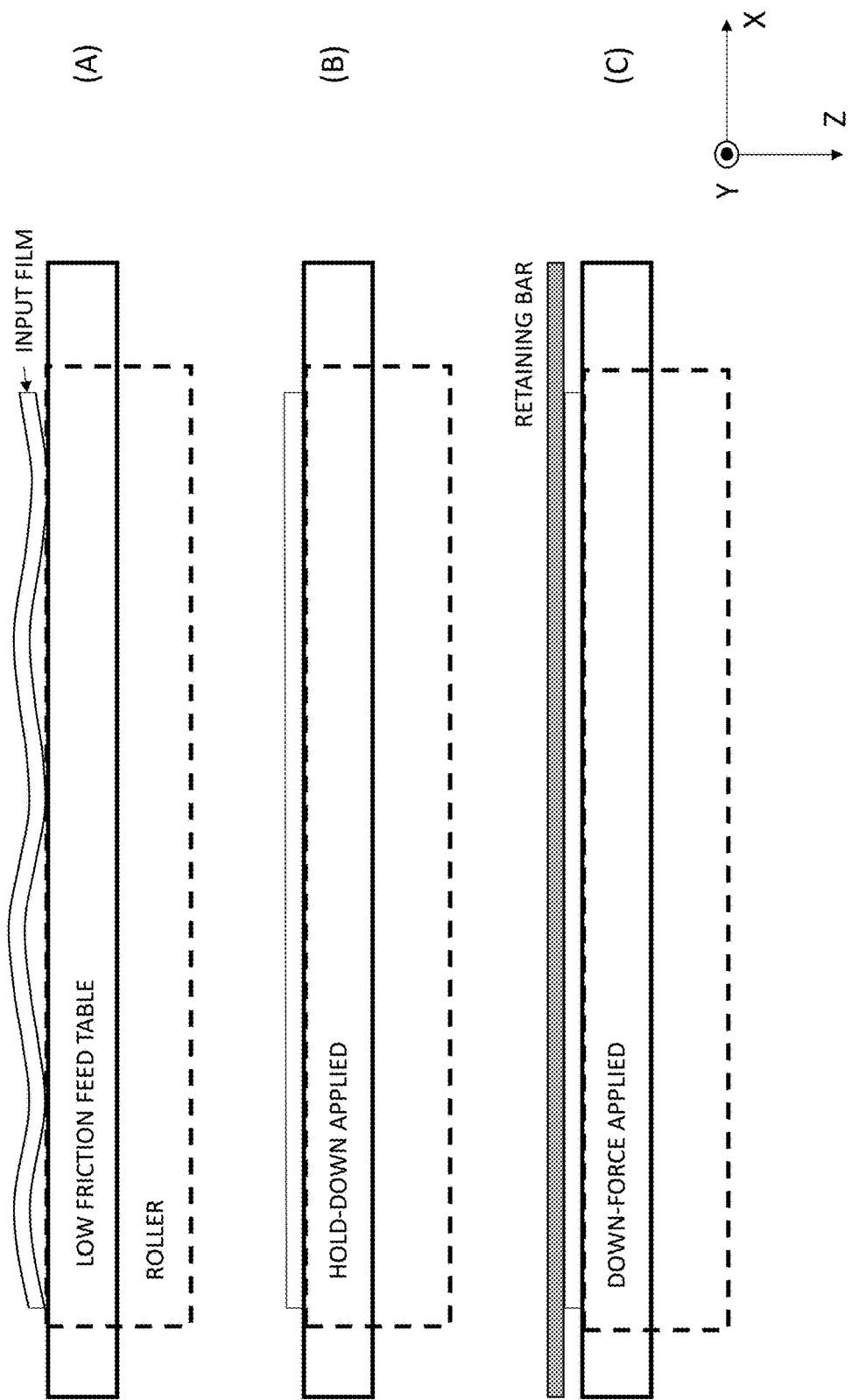
FIG. 5. Transverse-direction view of feed-plate with; (A) film in a relaxed state, (B) Film conformal to feed-plate and, (C) Film leading-edge captured between Retaining Bar and the Feed-Plate.

FIG. 5 shows a process for capturing the leading-edge of a feed-film and preserving it during nip-formation. The normal-direction of the film represents the machine-direction and the X-direction is along the transverse-direction. FIG. 5A shows the film on the feed-plate prior to the application of hold-down force. FIG. 5B shows the film after the application of down-force, where it is conformal to the feed-plate as described previously. FIG. 5C shows the actuation of a Retainer Bar (RB) to the top of the leading edge of the feed-film. The RB captures the feed-film between it and the roller, such that an established orientation is preserved, and there is insignificant in-plane stress induced. The RB may have a low surface-energy coating, or it may be made of a low-surface energy material. The profile of the RB may be selected to provide a firm uniform grip of the film without introducing any deformation when it is pressed into the roller. For instance, it may have a profile matched to that of the roller to uniformly distribute pressure. The RB may be substantially parallel to the roller axis over the entire transverse-direction, such that the pressure along the transverse-direction is uniform throughout the process of capturing the film. Alternatively, the RB may have a profile in the transverse-direction (e.g. a crown) to assist in spreading the film to create uniform contact with the roller without introducing in-plane stress. In this case, the RB may make initial contact near the center of the roller, and pressure may then spread outward bi-directionally in the transverse direction as the pressure increases. Similarly, the roller may have a uniform diameter, or it may have a profile such as a crown that controls the local pressure in the nip.

Figure 6:
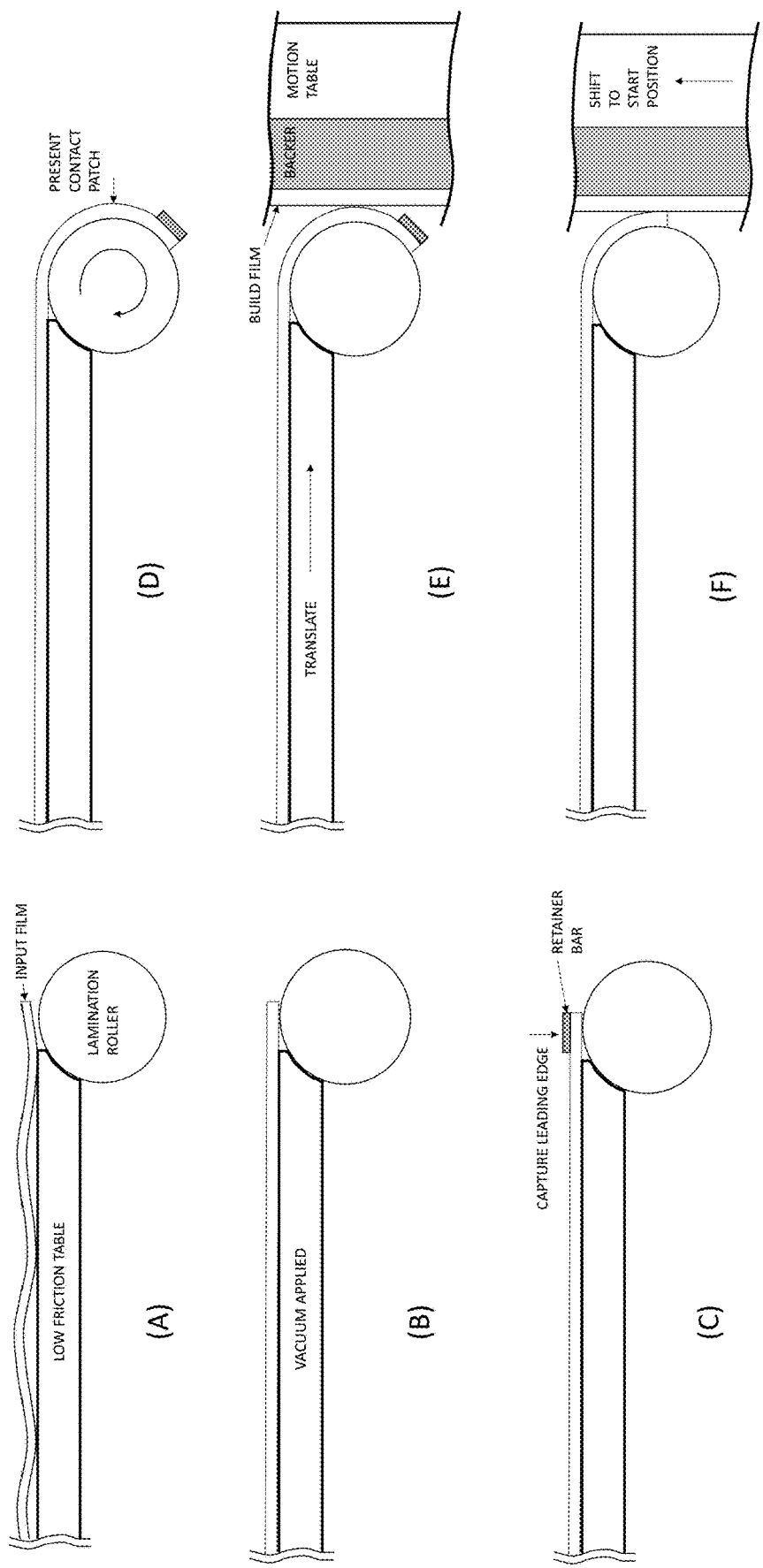
FIG. 6. A process for forming an exemplary nip according to the invention, including; (A) Aligning the input-film mechanically on the feed-plate, (B) Forcing the film to be conformal to the feed-plate, (C) Capturing the leading-edge of the film with a Retainer Bar, (D) Winding the film partially around the lamination roller, (E) Forming the nip, and (F) Removing the retainer bar and moving the table to the start position.

FIG. 6 shows a six-step process for supporting the leading-edge of the feed-film during nip formation. This shows a side view, where the normal to the figure is along the roller axis. FIGS. 6A-C are similar to FIG. 5, shown from a different perspective. As in FIG. 5, FIG. 6A shows the film resting on the stage, FIG. 6B shows the film after it is made conformal to the feed-plate, with a minimal length of unsupported film extending over the top of the roller and FIG. 6C shows the leading edge of the film captured by the Retainer Bar (RB). FIG. 6 shows the table in a horizontal position, though the table may be angled. If angled, it may be preferred that the angle is small enough that the film does not slide into the nip under the influence of gravity when manual or vacuum hold-down is not applied. FIG. 6D shows the step of advancing the film partially around the lamination roller. This may be done by driving the RB and using an idler lamination roller, or by using a driven lamination roller. There may be some tension applied to the film via feed-table vacuum, air, or electrostatics as the film is advanced around the roller. This would be done to ensure that the film makes uniform contact with the entire surface of the roller. As with the feed-plate, making the film uniformly conformal to the roller effectively increases film thickness and thus removes uncertainty. An objective is to make the film completely conformal to the roller without introducing in-plane stress. While there may be in-plane stress applied during the process of advancing the film around the roller, it may be significantly reduced or eliminated entirely when the nip is formed. The amount of tension required depends upon the tendency for the film to physically separate from the roller, which can leave the film unsupported and can lead to the uncertainty issues described previously.

A benefit of making the film conformal to the roller is that it eliminates a degree of freedom that exists when the film is not under any load. For example, it is easy to introduce one-axis curvature into a flexible film using very little bending force, but it takes a great deal of force to introduce curvature into a film along one axis when it is already curved about the orthogonal axis. The desired single-axis curvature can be introduced using a conventional roller, where a rubber/silicone layer is cast on a shaft and machined/polished. The RB can be used to capture the film and the above process can make the leading-edge conformal to the roller. Alternatively, a vacuum roller could be used to force the film to conform to the roller without the requirement of an RB. In this case, the vacuum should be applied uniformly, such that no in-plane stress is induced when the vacuum is turned on, or when the film is advanced around the roller. The roller may be driven in this case. One concern with a vacuum roller, is that the perforations or features that allow air to pass through the roller medium to apply force to the film may produce small pressure nonuniformities during lamination. For instance, porous ceramic vacuum chucks usually have local surface depressions even after polishing, and if the film is conformal, a subsequent lamination process could transfer the surface irregularity to the lamination. In the case of optical films, this "read-through" due to nonuniform-pressure, or local irregularity in reference-surface flatness, can render the retarder stack optically unacceptable. A second concern when using a vacuum roller is that the vacuum may be applied to the underside of a protective liner. If the adhesion of a liner to the retarder is inadequate, it may separate when the film is advanced around the roller.

Other methods for making a film conformal to a roller include down-force via air-pressure, electrostatics, or a low-tack adhesive. Down-force from compressed air is functionally the most similar to the RB, though the relatively robust attachment to the roller using the RB lessens any concern regarding slip. The other methods have the same concern discussed above regarding separation of the liner from the film. Electrostatic hold-down also introduces a concern that cosmetic-issues may arise due to electrostatic attraction of dust.

Regardless of the mechanism, the amount that the film advances around the roller is minimally that required to expose the nip portion of the feed film while avoiding mechanical interference issues. FIG. 6D shows that the RB has advanced far enough that the feed-plate/roller assembly can be brought into contact with the build-plate without mechanical interference. FIG. 6E shows the nip formation, where the feed-plate/roller assembly is translated horizontally and the roller presses the feed-film to the build-film. Again, this nip is optimally formed with the feed-film making uniform contact with the roller with minimal in-plane tension. Once the initial-condition for lamination is established by the nip, the RB can be removed, as shown in FIG. 6F. With the RB removed, the build plate can shift to a start position that improves the material utilization. At this point, the solvent can be dispensed and the vertical table can move downward and the lamination is complete.

Since the initial condition of the nip determines the lamination axis and the uniformity with which the films are brought together, no precision mechanisms (e.g. guides) are fundamentally necessary to control the lamination process. However, it may be useful to continue to provide loose support for the input-film as it traverses the feed-plate. This can be done using (e.g.) a small vacuum hold-down, or it may be adequate to provide a bar mounted above the film (not shown) that ensures that the film remains conformal to a portion of the roller in the nip as it advances. As discussed previously, any vacuum hold-down during lamination should not affect the in-plane statistics of the retarder film. A bar suspended slightly above the feed film may be preferred for that reason. Since this bar may touch the surface of the film, it must remain clean (i.e. free of solvent and dust) and it must not scratch the surface. Near the end of lamination, there is an increased tendency for the trailing edge of the feed-film to lift off of the feed-plate. If no hold-down mechanism is in place, this material may experience greater exposure to solvent, and therefore functional damage. In order to maximize mother-sheet yield, the hold-down mechanism may support the trailing-edge of the feed-film as close as possible to the nip. The bar may be fixed or it may rotate as the film advances. Note that a hold-down bar may create some challenges for feed-film liner removal if it is in a static position throughout the build process. It may be preferable to have a bar that lifts relative to the feed table during film loading and liner removal, and drops to just above the film during the lamination process. Alternatively, the bar may remain near the build-plate, far from the liner-removal process.

Figure 7:
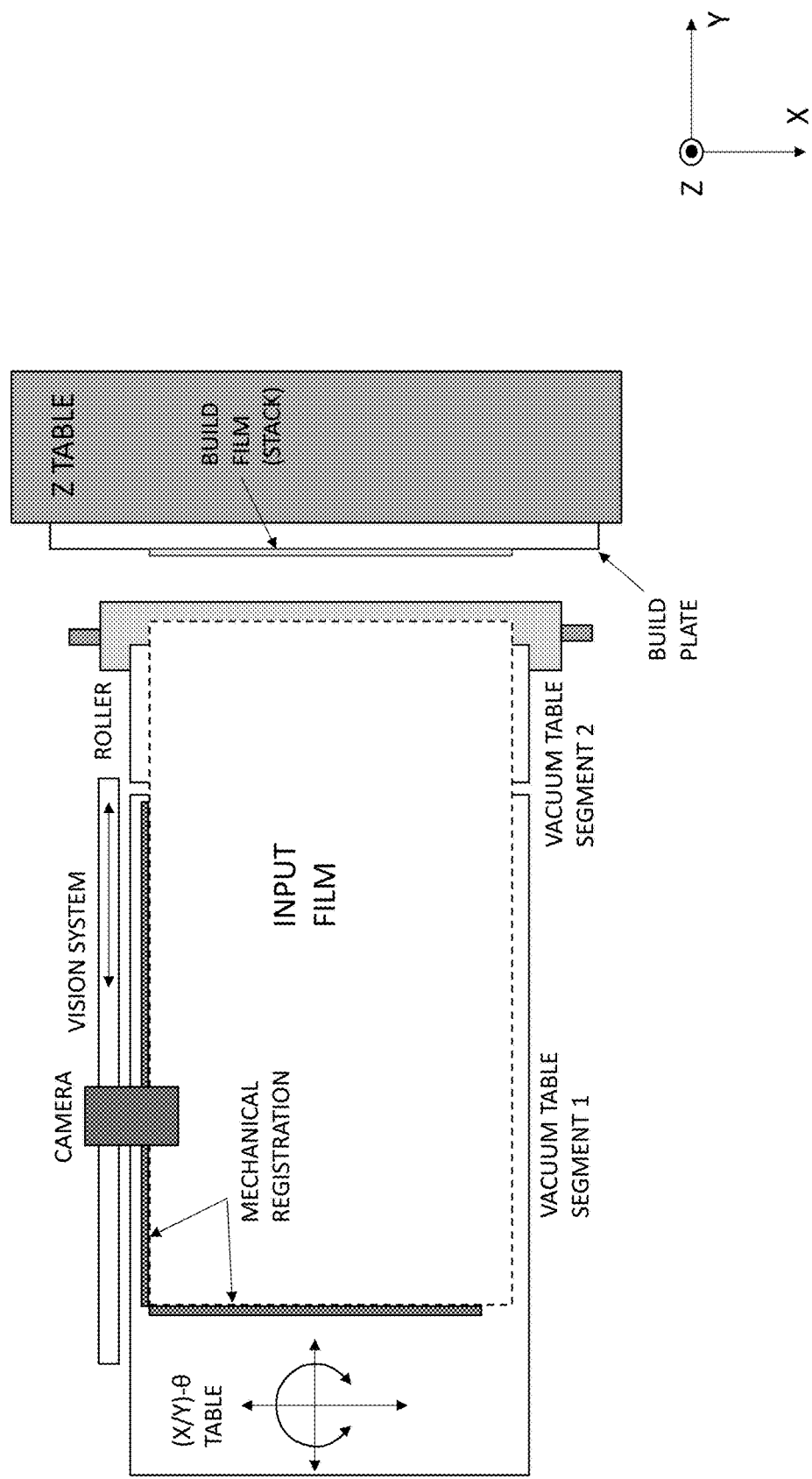
FIG. 7. Top-view of a laminator configuration of the invention using a segmented feed-plate.

FIG. 7 shows the top-view of an exemplary batch-process solvent laminator. Rather than translate the entire feed-plate/roller assembly to form the nip, this design uses a segmented feed-plate. The operator places the input film substantially on the first segment (dashed outline of rectangular mother sheet), with a small portion extending onto the second segment. Mechanical alignment features (which may simply be adhesive tape) on the first segment can be used for coarse alignment of the film to the table. The (co-planar) second vacuum-table segment is part of the assembly that may include the lamination roller. The mother sheet spans the entire length of the second vacuum table segment, with a small portion extending beyond, and onto the lamination roller. After the mother-sheet is aligned on the feed-table, the sheet is held down via vacuum. The operator may remove a protective liner from the upper side of the feed-film. An anti-static air-knife may blow off the feed film to remove any debris. A vision-system, including lighting, a camera, a translation stage, and image processing software, rapidly and accurately locates the machine-direction edge of the mother sheet. In the event that there is any "wander" in mother-sheet edge straightness from cutting, an algorithm may be used to make a best-fit to the edge-data. Alternatively, a single camera with a sufficient angle-of-view, or two or more cameras in a fixed position can be used to locate the film edge. If the operator has placed the input-film on the stage without sufficient accuracy, an alarm can inform the operator that the film must be repositioned. The vision system may rely upon data from scanning the portion of the film on the first vacuum-table segment, in which case vacuum may not be applied to the second vacuum table segment. Alternatively, the entire length may be scanned, in which case, vacuum may be applied to both segments.

After the film edge is located, a fine repositioning of the input film can be done using a motion-table on the first vacuum-table segment. The type of motion most critical is that of orientation, where the coarse positioning in the transverse and machine-directions may be adequate. For instance, an operator may be able to position the film with ±500 microns of XY accuracy, which may have no impact on the resulting stack performance. However, 500-microns of wedge over an A4 mother sheet represents a 0.1° angle error, which in many cases is unacceptable. With the vacuum applied only to segment 1, the film is repositioned and (at very least) the orientation tolerance can be greatly improved. Alternatively, compensation for uncertainty in the feed-sheet position may be corrected using a stage mounted on the build-side. If there is any orientation uncertainty in capturing the film, an adjustment on the build-plate orientation can correct for it by scanning (or forming an image of) an edge after the edge is captured. For the case shown, a gap between the first and second vacuum table segments allows the first segment to rotate by (e.g.) ±1° without mechanical interference with the second segment. A table that supports A2 laminations may have a width of approximately 450 mm. A rotation of ±1° thus requires a gap of approximately 8 mm between the segments. In the event that the film is flexible enough that it sags in a gap of this width, a flexible material can span the gap that provides support of the film. Current state-of-the-art precision in vision-system edge alignment is +50 microns. Using an A4 mother-sheet, this represents an orientation tolerance of +0.01°.

Once the film is repositioned, vacuum on the second segment can be applied and the film is fully held down, with the exception of the small length that extends onto the roller. As described previously, a Retainer Bar (RB) suspended above the roller (not shown) can then capture the leading-edge by pressing it uniformly to the lamination roller. The RB may be attached to a mechanism that drives the input film partially around the lamination roller as described previously. Once the film is conformal to the roller and film stress is minimized, the contact-patch is presented to the build-plate and the roller translates horizontally and forms the nip. In one configuration, the second vacuum-table segment travels with the roller to the build-plate. In this case, vacuum to the first vacuum table segment is cut, and that on the second segment may remain on during translation. In so doing, the second segment can be used to retain some tension during nip formation, and even during lamination. Additionally, the hold-down bar may be part of this translating assembly.

The translating assembly may have one or more motion mechanisms. For instance, the amount of working distance required between the feed-stage and the build-stage for protective liner removal after lamination may require a fast two-position stage with a relatively large translating distance. Once the stage is moved into the lamination position, the roller may extend a relatively short distance using a different mechanism. For example, an air-cylinder or servo-motor may translate the roller (e.g.) 10-20 mm to form the nip.

A solvent dispense-head can then travel in the transverse direction, with one or more shots dispensed in the nip. A motion control stage on the build side can then move downward and the weld is formed. At the end of the cycle, the feed-stage and build-stage return to the start position. If a protective liner is on the underside of the feed-film, it can be removed either manually, or using a robot. An air-knife can blow off the build side and the process can be repeated until the stack is complete.

Figure 8:
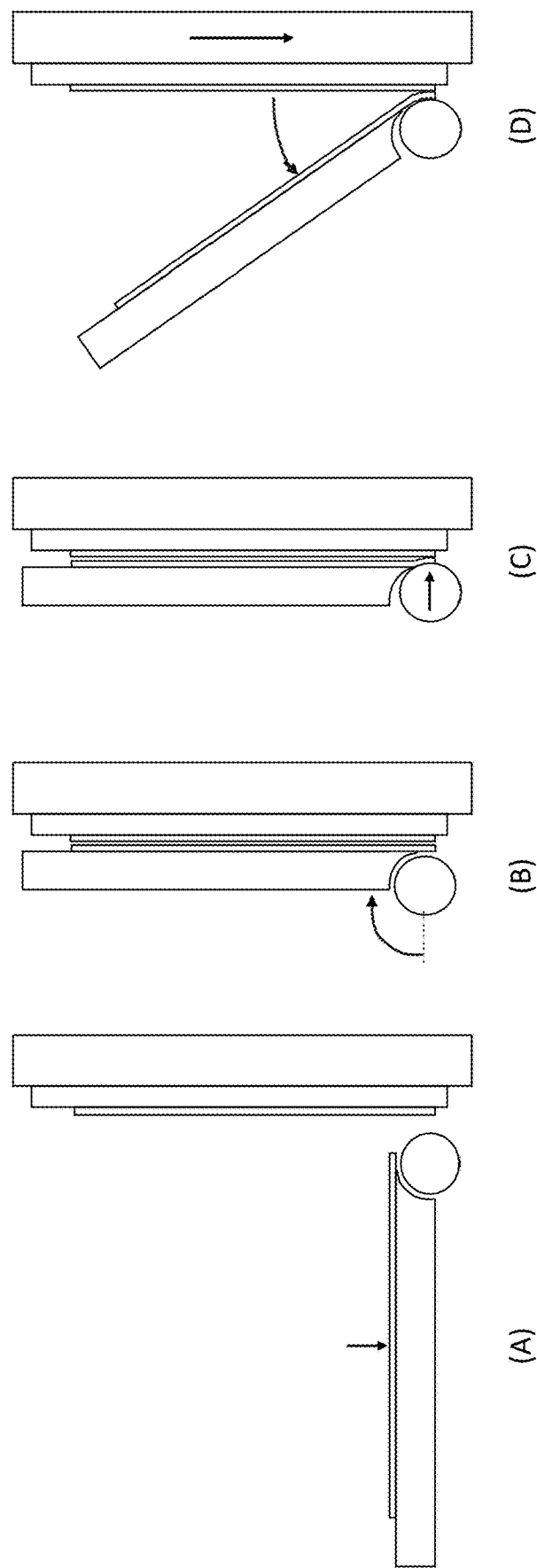
FIG. 8. Process steps for an alternative laminator configuration of the invention using a single three-position feed-plate.

There are other embodiments of the inventive laminator that are similar in terms of reducing orientation error and in-plane lamination stress. The above example represents a practical solution that minimizes the amount and complexity of motion for the various elements. An alternative, illustrated in FIG. 8, is to use a single-segment feed table. After fixturing the feed-film with vacuum, as shown in FIG. 8A, the entire feed-plate assembly can translate/rotate as needed to a second-position to optimally present the leading edge of the feed-film to the build-film. In the second position, illustrated in FIG. 8B, the feed plate may present the leading edge of the feed-film to the build film in a quasi-parallel fashion, with a small controlled gap between films prior to roller extension. In this case, the roller assembly may be static with only horizontal translation via an air-cylinder or servo-motor to form the nip. Also, the present configuration may eliminate the need for the RB. After the roller extends and the nip is formed, as shown in FIG. 8C, the feed-plate may rotate/translate to a third position that allows solvent dispense and feed-film hold-down without mechanical interference. FIG. 8D shows the feed plate opening the angle between the feed-plate and build-plate to allow solvent injection. Once the nip is formed, the relative film orientation and in-plane pressure are substantially established and the feed-plate may then have the low-precision function of providing a support surface. Similarly, a guide bar mounted above the feed-film, may have the low-precision function of keeping the film from lifting as it travels along the feed table. After the lamination is complete, both stages can return to the start-position. This design may provide some design simplifications, though it may also require more complex motion from a single, substantially more massive, feed plate assembly.

Figure 9:
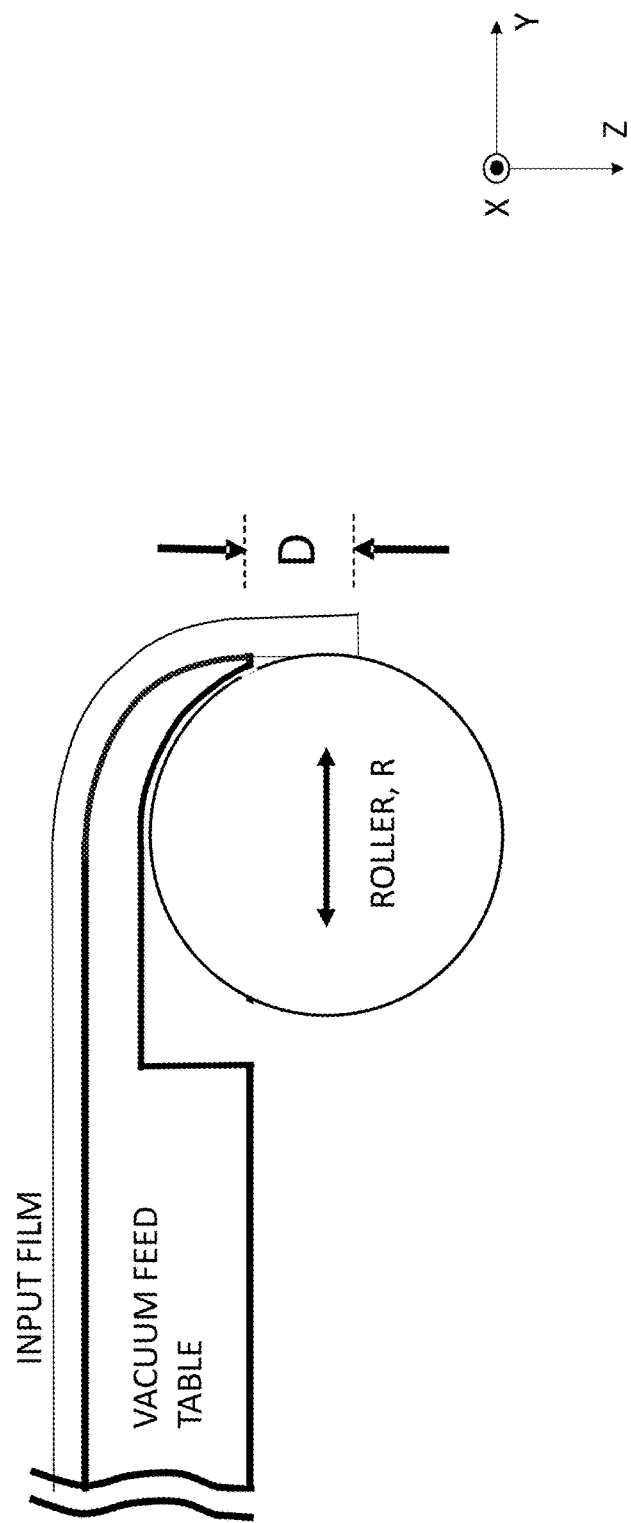
FIG. 9. Enlarged view near the end of a feed-plate of the invention with a contoured upper surface that applies a vacuum bending force.

FIG. 9 shows an enlarged view near the end of a feed-plate representing an embodiment. In this case there is a contour at the end of the upper side of the plate, where vacuum can be applied over the surface of the contour. Vacuum zones can engage sequentially (e.g., left-to-right), such that the film conforms to the plate uniformly. Upon application of vacuum at the end of the feed-plate, the film experiences a bending-force that reorients it in a downward position. This can reduce or eliminate the need to rotate the feed plate as shown in FIG. 8B. In this case the film may be conformal to the feed-plate contour, with a small length D of the leading-edge overhanging. The pre-loaded film may be substantially tangent to the roller (of radius, R) at the leading-edge. As discussed previously, the peel-strength of any release liner must be sufficient that it does not delaminate under the influence of the bending force. Once the film is in the downward position in contact with the roller, the nip can be formed. This can be done by translating the roller with a static feed-plate, translating the roller with the feed-plate, or both. As discussed previously, there may be working-distance benefits to having large travel of the pair, with short-travel translation of the roller to create the nip.

Solvent lamination can in principle be accomplished in any nip orientation, provided that the (low viscosity) solvent distribution is well controlled. A particularly practical method for solvent lamination is accomplished vertically, or near vertically. After the nip is formed, solvent can be dispensed and a solvent reservoir can be formed that remains in a quasi-stable position until the lamination table moves. A time delay can allow capillary forces from the films to uniformly distribute the solvent in the nip and the lamination can then proceed. Because very little solvent may be required locally to form the bond, and because it can occur quickly enough that evaporation may not be significant, a single-dispense at the start-of-lamination can be sufficient to laminate sheets that are 600-1,000 mm in length. Alternatively, solvent can be dispensed to replenish the solvent reservoir during the lamination when it is not practical to dispense enough solvent to complete the lamination using only a pre-lamination dispense.

Figure 10:
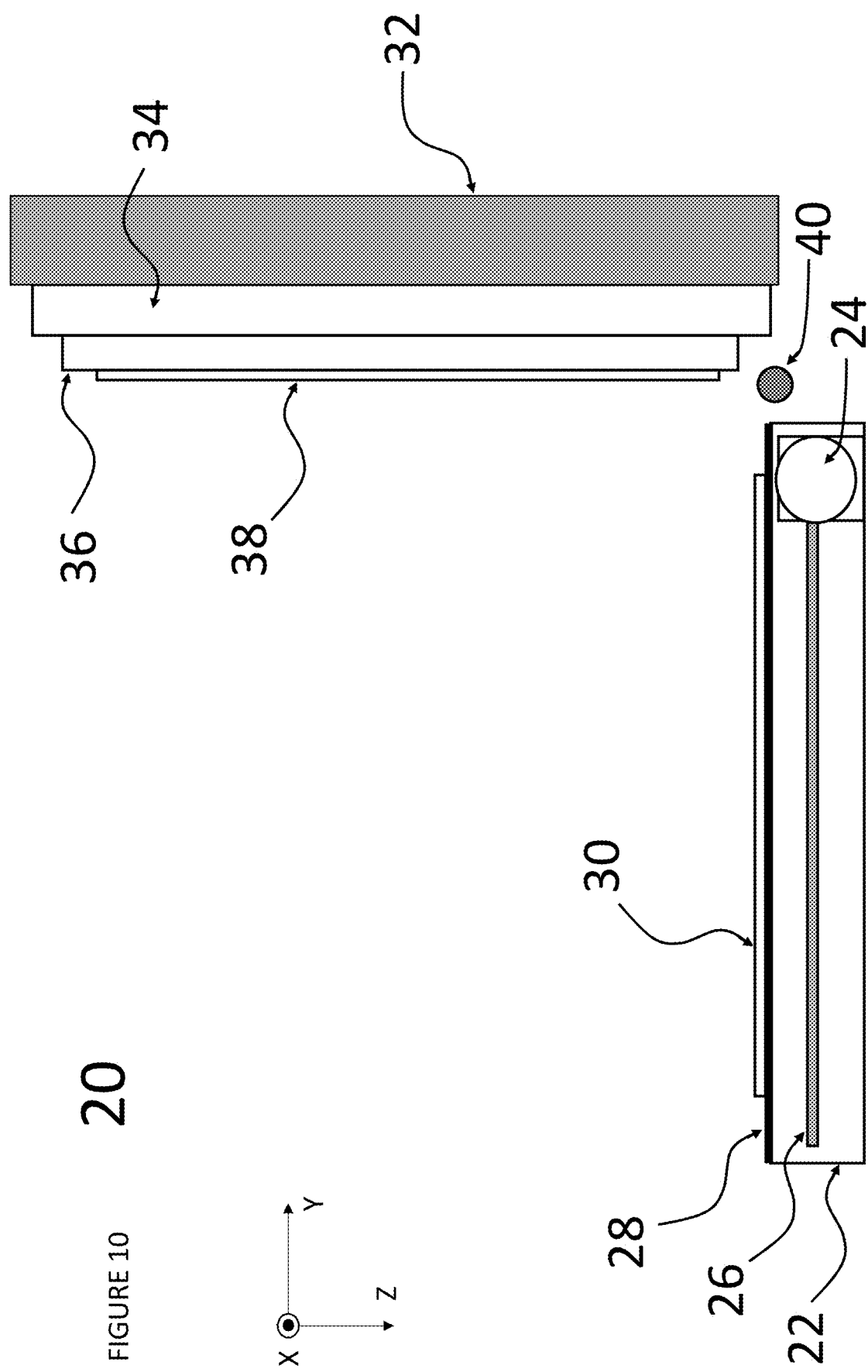
FIG. 10. Solvent laminator of the invention using a deformable support member.

In another single-roller lamination process, nip formation involves bringing together five elements: (1) The lamination roller, (2) a deformable support member (DSM), (3) the input film (including any protective liner), (4) the build-film (or work-in-progress stack, including any lower protective liner), and (5) the build-plate. The addition of the DSM is done to support the entire area of the feed-film during lamination without introducing in-plane stress. The DSM can effectively increase the thickness of the feed-film and make it more mechanically stable. This approach has the potential advantage that the film is fully supported, even where the nip is formed. FIG. 10 shows solvent laminator 20, consisting of a feed-assembly, 22, and a build assembly (32, 34). The feed-assembly is shown as substantially horizontal during film-loading, and the build-assembly is shown as substantially vertical. There is some flexibility in angles, though one consideration is the convenience of horizontal film loading. A second consideration is that the lamination should be done at a sufficiently steep angle that solvent does not flow in the lamination direction in the absence of roller influence. The feed-assembly may be a quasi-sealed box, containing a roller mounted to a Z-translation stage (e.g. an air-cylinder or servo-motor), with that entire assembly traveling on a Y-translation stage (e.g. a worm-drive), 26. The deformable support member, 28, substantially covers the upper side of the box (XY plane). The DSM is under tension, so that it can fixture the feed-film, 30, in a planar fashion prior to lamination. The DSM may be a polymer (e.g. mylar), or it may be a metal (e.g. stainless-steel). A suitable material/thickness allows uniform pressure from the roller to be transferred to the materials being laminated.

After the feed-film, 30, is loaded and coarsely aligned (e.g. using a tape that defines two axes), it can be fixtured by applying a vacuum to the enclosure, 22, and a protective liner can then be removed. The DSM may transfer vacuum to the feed-film and hold it firmly in place, supporting it over the entire area. Care must be taken to ensure that such vacuum features do not compromise the lamination locally. As in the previous embodiment, a vision system can locate the film edge by (e.g.) scanning along the machine-direction. The stage for precision aligning the film may be located on the feed-side, or on the build-side. In this case, the positioning stage for precision alignment, 34, is mounted on a vertical fixed plate, 32. The build-plate (e.g. a flat glass plate), 36, can be held rigidly to the positioning stage using vacuum or a mechanical means. The build film (or stack), 38, is attached to the build-plate via a tape, optical contact, or low-tack adhesive. Once fixtured and aligned, a hinge-mechanism, 40, can lift the feed-assembly such that it locks into place with the same surface-normal direction as the build-assembly.

Figure 11:
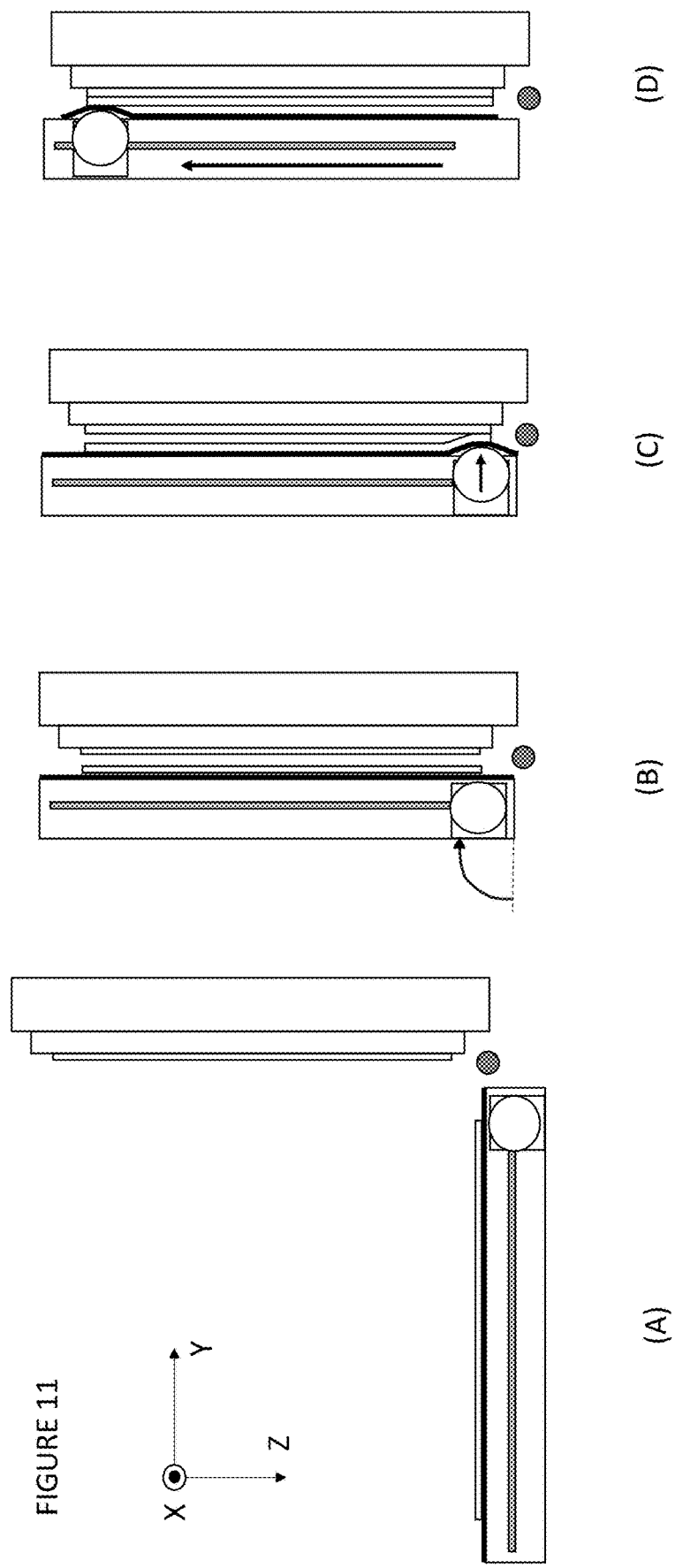
FIG. 11. Process steps for a solvent laminator of the invention using a deformable support member.

FIG. 11 illustrates the lamination process using the solvent laminator of FIG. 10. FIG. 11A shows the laminator in the load-position as in FIG. 10. FIG. 11B shows the hinging of the feed-plate to the vertical position about the X-axis. A uniform gap between the feed-film and the build film is formed after the feed-plate is locked into place. This gap facilitates introduction of solvent, it accounts for the maximum thickness of the stack, and it also affects the angle between the feed-film and the build-film at the point of lamination. If the gap is small, the angle between the films is likewise small and capillary force may cause the solvent to rise too far ahead of the point of lamination, damaging the films. When the gap is increased the roller likewise translates further in the Y-direction to form the nip and the angle between the films is increased. If rigidly fixed at the boundary, the strain in the DSM increases with the gap, and the pressure applied by the roller air-cylinder or servo-motor may be increased to maintain a constant nip pressure. Other factors that affect the angle between the films after forming the nip include the Youngs modulus, the thickness, and the tension in the DSM prior to roller extension. If the required angle necessitates a large strain in the DSM, it is important that it not transfer in-plane strain to the input-film at the point of lamination.

A method for mitigating in-plane stress on the input film from DSM strain is to provide some slip when the nip is formed. For example, if the film is only fixtured at the start/end of lamination, the vacuum may be sufficiently weak that the film slips when the nip is initially formed, relieving the stress. Another method to relieve strain in the DSM is to introduce flexible boundary conditions. If the strain is introduced near the boundary, rather than in the portion of the DSM supporting the film, there may be relatively low stress applied to the input film. FIG. 12 shows a blow-up of the nip region from FIG. 11C. FIG. 12A shows the example of a gap with width $W_1$ forming an approximate angle $\theta_1$ between the films. In this case, there is a single DSM layer that comes under quasi-uniform strain when the roller extends. This strain may be partially transferred to the input film. FIG. 12B shows the case where the gap between the films is increased to $W_2$, in order to produce a larger angle, $\theta_2$. Were the DSM to be of the same construction, a larger strain would be introduced to form the nip and the input film could come under increased tension. However, as shown in FIG. 12B, the DSM could be composed of an inner part that supports the feed-film, and an outer part that substantially relieves tension. The inner part may have a higher modulus material, it may be thicker, or both, relative to the outer part. The purpose of the outer part is thus to produce most of the strain needed to produce the desired nip geometry, leaving the input film supported but without in-plane stress.

FIG. 11C shows the extension of the roller (in the Y-direction), forming the nip. A low-profile dispense-head may be in place prior to lifting the feed-table, or it may be inserted after. After forming the nip, the needle may dispense one or more shots as it retracts, creating a solvent reservoir. The solvent dispense pressure may be minimized as a means of avoiding spatter and the associated film damage. FIG. 11D shows the translation of the roller in the Z-direction, welding the films together. At the end of travel, the roller retracts and returns to the start position, and the feed-table returns to the load-position.

There may be concerns in this configuration regarding the impact of the DSM on the quality of the lamination. If the DSM provides vacuum to fixture the feed-film (e.g. through-holes), there may be areas where the pressure required to form the weld is insufficient. In this case, the films may experience excessive exposure to the solvent, and in the absence of sufficient pressure, a reliable weld may not occur. In a configuration, vacuum holes may exist only on a sacrificial portion of the mother sheet. For instance, vacuum holes may exist only along the transverse direction at the top and bottom of the lamination. This may provide sufficient support of the film without significantly affecting yield.

Because the DSM is an intimate part of the lamination, it should have excellent thickness uniformity and surface quality. Otherwise, pressure nonuniformity can exist that causes read-through textures and local in-plane stress. In order to ensure pressure uniformity in the nip, it may also be necessary to provide different tension in the machine-direction than in the transverse direction. It may be preferred for the DSM to be substantially conformal to the roller during lamination, and the presence of tension in the DSM at the ends of the roller could be disruptive. This can be overcome by extending the roller/DSM length sufficiently beyond the width of the film, or by relieving some of the stress in the transverse direction. The latter can be done by making the DSM more flexible in the region outside the nip by thinning, or using a different material. This is similar to the aforementioned method for minimizing machine-direction strain in the DSM when the roller engages.

In general, materials and tolerances for elements in intimate contact with the nip, must be carefully selected. Optical quality specifications are usually preferred in order to avoid print-through or read-through textures in a laminate that can result from local nonuniformities in pressure and solvent-exposure. These nonuniformities can occur due to affects both in-plane and normal to the sheet. Roller density, thickness and surface nonuniformities must be scrutinized, including material homogeneity, roller casting/machining process and associated defects (e.g. bubbles or inclusions in the cast roller material). The roller-axis must be precisely aligned to the build-plate to avoid a transverse-direction pressure ramp. Protective liner thickness uniformity must be scrutinized, along with cleanliness of the protective liner lamination. Build-plate thickness uniformity and surface-quality must be scrutinized. Exemplary build-plate materials include polished glass, polished-metals, and potentially (e.g. cell-cast) polymer. The latter can be helpful for a single-use build plate, or to reduce the weight of the build-plate in large-area laminations. Build-stage flatness must be scrutinized. If the build-plate is held to the build-stage using vacuum, the vacuum features must not print through to the laminate. This can be done by making the vacuum features outside of the lamination area, making them sufficiently small, or using a build-plate with sufficient stiffness that they do not affect the lamination quality. Of course, all elements that make up the nip must be free of debris. Particles trapped in the lamination affect cosmetic yield, with solvent impacted area typically much larger than the physical particle. Particles outside of the lamination can affect the local flatness/transmitted-wave-front quality of the finished stack. The latter can appear as dimples or craters that become particularly problematic if one surface of the finished stack is subsequently bonded to another optical surface.

The method for attachment (i.e. temporary fixturing) of the first retarder film ply to the build-plate must be scrutinized. This process is preferably done using the laminator (e.g. with welding solvent dispense turned off), so that the machine-vision system places all films with the same precision, with the same convenience, and with minimal handling. The attachment method may be an adhesive applied to a sacrificial area of the mother sheet or build-plate (e.g. a double-side tape along the transverse direction at the start/end of lamination), or it may be a full-face bond. The adhesive may preferably be transferrable without the need to transfer a carrier substrate to the build plate (as with an adhesive tape). The functional purpose of the adhesive is to fixture the first ply with some of the same requirements as the welding process (i.e. maintaining orientation precision with minimal in-plane stress). If discrete attachments are made at the top/bottom, the film must not move significantly in-plane during subsequent lamination steps. If excess solvent is pushed out at the end-of-lamination in subsequent solvent welding, it must not wick under the stack and damage it. The discrete attachment method may have some benefits in terms of allowing the film to mechanically "float" in the lamination area which may help to reduce in-plane stress.

If a protective liner is on the underside of the retarder-film, it preferably has low surface-energy. A protective liner (or an unprotected retarder) may have high surface-energy, and thus make random optical-contacts when brought into contact with the build plate, causing in-plane stress. Moreover, any air trapped at the interface between these surfaces during attachment of the first ply can create local pressure nonuniformity and textures in the finished stack. As in all previous analysis pertaining to welding, any in-plane stress in attaching the first ply can be baked-in when it is welded to the second ply.

For more complete support, a full-face bond of the first ply to the build-plate may be done using an adhesive previously applied to the first-ply protective liner or the build plate. This could be done by dipping or spraying the lamination side of the build plate and then attaching a release liner that can be removed when the build-plate is installed in the laminator. If the build plate must be cleaned and re-used, the adhesive is preferably of a chemistry that makes it easily removed with water or a non-aggressive solvent (e.g. isopropyl alcohol). The adhesive is ideally applied with precise thickness, and/or has minimal thickness (<1 micron), such that any nonuniformity in adhesive thickness does affect the flatness of the laminate. An extreme example of the latter is a self-assembling-monolayer (SAM) that is water-soluble, with head/tail groups that provide adequate attachment of the build-plate material to the protective liner. The tack may preferably be adequate to reliably fixture the stack during lamination, but with lower tack than that of the protective liner to build-plate. The latter allows easy removal of the finished stack (with liners on both sides) from the build-plate. If the adhesive layer is extremely thin (e.g. a SAM) it may provide no compliance when the first ply is laminated. This situation may differ from solvent welding in that there may be no liquid in the nip during attachment. The lamination process ideally does not rely upon compliance at the build plate to minimize in-plane stress. However, some mechanical isolation between the first ply and the build-plate can be accomplished via the mechanical properties of the protective liner (thickness/modulus/surface-energy). In some instances, the adhesive may be in liquid form when the first ply is attached and it may therefore provide some lubrication that minimizes in-plane stress. For instance, a cyanoacrylate adhesive with low viscosity may be dispensed in the nip and rolled on to attach the first ply.

There are other potential methods for first-ply attachment to the build plate. It can be done using vacuum transferred through the build-plate from the build-stage. These vacuum features may be just on a sacrificial portion of the mother sheet. As discussed in reference to the vacuum roller, very small features that enable vacuum hold-down can destroy the optical properties of the retarder-stack. A full-face attachment can also be accomplished using electro-static attraction of the first ply to the build-plate. The attachment can also be accomplished via Van der Waals attraction forces between the protective-liner (or bare retarder) and build-plate chemistries. A suitable liquid can be dispensed in the nip to facilitate a chemical bond that is strong enough for fixturing but is easily broken when the completed stack is peeled off.

The invention claimed is:

1. An apparatus for precisely solvent-laminating two or more retarder films with low in-plane stress, comprising:
   a feed-plate adapted for fixturing a single-ply retarder film, including mechanical features for approximately locating the position and orientation of the single-ply retarder film;
   a build-plate adapted for fixturing the one or more plies of a retarder stack;
   a vision system adapted for locating the feed-ply position and orientation;

a first motion table affixed to either the feed-plate or the build-plate adapted to correct for relative errors in position and orientation between the retarder film and the retarder stack using information delivered by the vision system;

a second motion table and a lamination roller adapted for laminating the feed-ply to the one or more plies of the retarder stack, wherein the lamination roller is further adapted for placement proximate to the feed-plate such that a length of the retarder film that is unsupported between the feed-plate and the lamination roller is less than the radius of the lamination roller;

a solvent-dispense head adapted for delivering solvent to a nip; and a mechanism adapted for delivering a leading edge of the feed-ply to the retarder stack and which substantially preserves the relative orientation between the feed-ply and retarder stack and minimizes in-plane stress on the feed-ply.

2. The apparatus of claim 1, wherein the feed-plate is located in a substantially horizontal plane and the build-plate is located in a substantially vertical plane.

3. The apparatus of claim 1, wherein the magnitude of the feed-plate angle is <40° relative to horizontal and the magnitude of the build-plate angle is <20° relative to vertical.

4. The apparatus of claim 1, wherein the feed-plate is comprised of two segments: a first static segment that supports the film during vision-system alignment, and a second segment that delivers the leading-edge of the feed-ply to the retarder-stack to form the nip.

5. The apparatus of claim 1, further comprising an in-plane stress-mitigation mechanism wherein the leading edge of the feed-ply is captured between the lamination roller and a retainer-bar.

6. The apparatus of claim 5, wherein the apparatus is configured so the retainer bar can be advanced around the lamination roller to present the feed-ply to the carrier substrate or retarder stack without mechanical interference.

7. The apparatus of claim 6, wherein the apparatus is configured so the second motion table is driven to a start-of-lamination position after forming the nip and retracting the retainer-bar that maximizes area yield of the retarder stack.

8. The apparatus of claim 1, wherein the feed-ply is held in place during alignment using a vacuum fixture.

9. The apparatus of claim 1, wherein an optically-flat rigid carrier substrate affixed to the build-plate using vacuum or mechanical fastener, receives the retarder stack, wherein the carrier substrate and retarder stack can be removed from the laminator after completing the solvent lamination process.

10. The apparatus of claim 7, wherein the rigid carrier substrate is composed of polished glass or polymer.

11. A method for solvent-laminating two retarder films with low in-plane stress and high orientation precision, the method comprising:

aligning a first-ply retarder film on a feed-plate having mechanical registration features;

loading a carrier substrate onto a build plate;

locating an edge of the first-ply retarder film with a vision system;

selecting a position and orientation of the first-ply retarder film using a motion table affixed to the feed-plate;

transferring the first-ply retarder film to the carrier substrate using a lamination table affixed to the build-plate and a lamination roller, wherein the lamination roller is proximate to the feed-plate such that a length of the retarder film that is unsupported between the feed-plate and the lamination roller is less than the radius of the lamination roller;

aligning a second-ply retarder film on and retaining the second-ply retarder film against the feed plate;

locating the edge of the second-ply retarder film with the vision system;

aligning the second-ply retarder film to the first-ply retarder film using the motion table affixed to the feed-plate;

capturing the leading edge of the second-ply between the retainer bar and the lamination roller;

presenting the second-ply retarder film to the first-ply retarder film by translating a segment of the feed-plate, forming a nip;

dispensing solvent in the nip; and solvent welding the second-ply retarder film to the first-ply retarder film using the lamination table.

\* \* \* \* \*